June 3, 1930.  N. STATHAM  1,761,805
METHOD OF FABRICATING FASTENER OPERATING MEANS AND BLANK THEREFOR
Original Filed March 25, 1926  4 Sheets-Sheet 1

INVENTOR.
Noel Statham
BY
Edward M. Evans
ATTORNEY

June 3, 1930.  N. STATHAM  1,761,805
METHOD OF FABRICATING FASTENER OPERATING MEANS AND BLANK THEREFOR
Original Filed March 25, 1926  4 Sheets-Sheet 4

INVENTOR.
Noel Statham
BY
ATTORNEY

Patented June 3, 1930

1,761,805

UNITED STATES PATENT OFFICE

NOEL STATHAM, OF IRVINGTON-UPON-HUDSON, NEW YORK

METHOD OF FABRICATING FASTENER-OPERATING MEANS AND BLANK THEREFOR

Original application filed March 25, 1926, Serial No. 97,216. Divided and this application filed June 9, 1926. Serial No. 114,766.

My present invention relates to methods of fabricating keys or operating members for slidable fasteners and the like, as well as to blanks which may be used for fabricating such keys or operating members, and aims to devise methods for fabricating articles of the general character specified which are simple to practice, which render possible the economical fabrication of such keys or operating members in a novel, direct and expeditious manner, and which may be employed for the fabrication, for example, of two or even one piece keys or operating members of the general character specified above, the keys or operating members resulting from the practice of the methods of the present invention being characterized by their few parts, in the preferred cases, only two or even only one part, rather than three or more parts, the simplicity of such parts, the ease, economy and convenience with which such parts may be assembled in the fabrication of the finished key or operating member of the present invention, the ease and convenience in operation of such keys or operating members, and the avoidance in the structure of such keys or operating members of rivets or like separate means, passing through the devices or otherwise, for fastening or assembling such devices, and the avoidance in the structure of the devices of the present invention of the use of a plurality of wings, in overlying position or the like, to define a plurality of fastener-receiving channels, the keys or operating members of the present invention being preferably characterized by their embodiment of a pair of troughs or trough-like members each of which, independently of the other trough-like member, defines its own single and independent internal passageway instead of only partially or incompletely defining a plurality of passageways which are completed only by another portion of the device. Other advantages and objects of the methods and products of the present invention will in part be pointed out in detail hereinafter and will in part be obvious to those skilled in the art to which the present invention relates.

The keys or operating members themselves form no part of the present invention being fully claimed in a copending application of mine filed March 25, 1926, Ser. No. 97,216, entitled "Fastener-operating means", of which this application is a division.

In the accompanying specification I shall describe several illustrative embodiments of the methods of the present invention. In the accompanying specification I shall also describe, and in the annexed drawing illustrate, several illustrative embodiments of the blanks of the present invention. It is, however, to be clearly understood that my invention is not limited to the specific forms of the aforesaid illustrative embodiments of the methods and articles of the present invention shown and described herein by way of illustration only, except as defined in the appended claims.

Referring now to the aforesaid illustrative embodiments of the present invention, and more particularly to the aforesaid illustrative embodiments of the methods of the present invention, such methods, in their preferred forms, may be defined as the provision, in the first instance, of a blank, preferably unitary, having a plurality of trough member blank portions and an intermediate connecting portion joining such trough blank portions. The intermediate joining portion is preferably of reduced width as compared with the average width of the trough member blank portions, for a purpose to be described later in this specification. The blank is preferably also provided with a locking or reinforcing blank portion which may be an extension either of the intermediate or joining blank portion, or of one or both of the trough member blank portions, or of any combination of these portions. There is also provided an attachment blank portion for formation into means for attachment to the device of a handle or the like which such a handle or the like is desired to form a part of the finished device. In those instances where no separate handle is desired to be embodied in the devices of the present invention, this attachment blank portion may take the form of a handle blank portion which is adapted to be shaped into a handle in the device in its final form.

The trough member blank portions are each preferably adapted to be shaped into separate or independent trough members each defined by a bottom wall member and by side wall members, which latter may also have inwardly directed flange portions to define, in the desired manner, the internal passageway contained within each trough member for receiving the fasteners and the fastener-supporting tape forming a part of the flexible fastening devices with which the keys or operating members of the present invention are intended to be employed. The connecting portion joining the two trough member blank portions is preferably of reduced width so that it may be bent, preferably after the trough members have been shaped into trough-like form, as already indicated above, in order to cause such trough members to converge.

The locking or reinforcing blank portion is preferably so shaped and disposed as to adequately serve its function of locking or reinforcing the trough members. Finally, the attachment blank portion is of such form and is so disposed as to adequately serve its intended function of serving as an efficient attachment means for a handle or like device to permit the manual operation of the finished key or operating member along the flexible fastening device with which such key or operating member is intended to be used, in the case where a separate handle for such purpose is desired to be embodied in the finished devices of the present invention. On the other hand, where no such separate handle is desired, such attachment blank portion provides a blank portion for shaping an integral handle or manipulating member.

In fabricating the keys or operating members according to the methods of the present invention, I take a blank, preferably a unitary blank, such as defined above, and shape it initially so as to provide a substantially continuous trough from end to end, except that the side walls or portions of the trough may be, and generally are, omitted at the connecting portion, preferably of reduced width, joining the trough member blank portions. The joined trough members thus formed will each have a bottom wall and a plurality of joining side walls, together, preferably, with inwardly turned flanges for defining a passageway which, in the condition of the formed blank thus far described, is a substantially continuous passageway from one end of the partially formed blank to the other. This passageway is preferably substantially rectilinear as the blank is thus far formed, the trough members, making up what may be termed the continuous trough, are two in number and are adapted to be brought into converging position by being suitably bent at each end of the connecting blank portion.

The substantially continuous trough, having at each end thereof a trough member, the two trough members being connected by the intermediate connecting portion, are now brought into converging position by bending down the formed trough members at each end of the connecting portion so that the ends of the trough members are brought near together or into contact. It will be noted that each of the trough members independently defines a competely bound passageway, defined by a bottom wall and two adjoining side walls, together, preferably, with a pair of inwardly directed flanges for constricting such passageway.

While, in certain cases, this structure is sufficient of itself, and may be so employed, for the uses of the present invention without any further locking or reinforcing means, I prefer to lock or otherwise join the trough members so formed adjacent their point of proximity or contact. I may do this either with any suitable metal joining means, such as soldering or welding, or I may use a locking or reinforcing blank portion, as already described above, which may be bent over in a suitable manner to lock the two trough members together.

I now shape the attachment blank portion, where such portion is to be used for serving as attachment means for a separate handle or manipulating member for the device, so as to adapt the same for attachment to such handle or manipulating device. On the other hand, where no separate handle or manipulating device is to be used, but such handle or manipulating device is to constitute an integral part of the devices of the present invention, I so shape the attachment blank portion as to provide such an integral handle or manipulating device.

This completes the description of the methods of the present invention, as exemplified in the aforesaid illustrative embodiments of the same. Such methods are simple to practice, easy and convenient to carry out, and result in a strong structure which preferably comprises only two parts or even only a single part. The methods of the present invention avoid the use of a rivet or equivalent independent fastening means which has to pass through the device to assemble the same or keep the same in proper spaced relation. Due also to the formation of the independent trough members, as defined above, each comprising a bottom wall and joining side walls, no spacing means are required, as would be the case where a plurality of wings in overlying or like position are employed defining between them, by their cooperation, a plurality of channels. For the same reason, no means are required for preventing spreading, as is required in the case of the doublewing construction hitherto employed in the art.

Referring now to the drawings, wherein I have illustrated the aforesaid illustrative embodiments of the blanks of the present invention:

Fig. 1ª is a plan view of a blank which may be used for making one of the aforesaid illustrative embodiments of the present invention;

Fig. 1ᵇ is a plan view of such blank folded to provide a substantially continuous trough defined by connected trough members formed by the folding of the blank thus far;

Fig. 1ᶜ is a plan view of the fully formed key;

Fig. 1ᵈ is a side elevation of the fully formed key shown in 1ᶜ of the drawing;

Fig. 1ᵉ is a longitudinal section of the fully formed key taken along line e—e of Fig. 1ᶜ of the drawing;

Fig. 1ᶠ is a transverse sectional view of the fully formed key shown in Fig. 1ᶜ of the drawing;

Fig. 1ᵍ is a side elevation of such key showing the manipulating handle attached thereto;

Fig. 1ʰ is a top plan view of the fully formed key shown in Fig. 1ᶜ of the drawing;

Fig. 1ⁱ is a sectional view of the fully formed key shown in Fig. 1ᶜ of the drawing taken along line 1ⁱ—1ⁱ of such figure of the drawing;

Fig. 1ʲ is a cross sectional view of the fully formed key of Fig. 1ᶜ of the drawing taken along line 1ʲ—1ʲ of such a figure of the drawing; and Fig. 1ᵏ is a front elevation of the fully formed key showing the manipulating handle attached thereto;

Fig. 2 is a cross sectional view showing one form or outline of trough member which may be employed for one type of fastener showing another type of trough member which may be employed for a different type of fastener than that with which the form or outline of key member shown in Figs. 1ª to 1ᵏ, inclusive, of the drawing is intended to be employed;

Fig. 3 is a cross section of still another form of trough member adapted for use with still another type of fastener than that with which the key members already illustrated are intended to be employed;

Fig. 4ª is a plan view of a blank for still another illustrative embodiment of the present invention;

Fig. 4ᵇ is a plan view of the blank of Fig. 4ª of the drawing folded so as to provide a substantially continuous trough defined by connected trough members;

Fig. 4ᶜ is a front elevation of the key of Figs. 4ª and 4ᵇ of the drawing in fully assembled form; and Fig. 4ᵈ is a side elevation of the key shown in Fig. 4ᶜ of the drawing;

Fig. 5ª is a plan view of still another blank for forming another of the aforesaid illustrative embodiments of the present invention;

Fig. 5ᵇ is a plan view of such blank formed so as to provide a substantially continuous trough defined by connected trough members from the blank shown in Fig. 5ª of the drawing; and Fig. 5ᶜ is a side elevation of the assembled key formed from the blank illustrated in Figs. 5ª and 5ᵇ of the drawing;

Fig. 6ª is a plan view of still another form of blank for forming still another of the aforesaid illustrative embodiments of the present invention;

Fig. 6ᵇ is a plan view of the blank of Fig. 6ª of the drawing folded so as to provide a substantially continuous trough defined by connected trough members;

Fig. 6ᶜ is a front elevation of the key of Figs. 6ª and 6ᵇ of the drawing in assembled form;

Fig. 6ᵈ is a cross sectional view of the key shown in Fig. 6ᶜ of the drawing taken along line 6ᵈ—6ᵈ of Fig. 6ᶜ of the drawing;

Fig. 6ᵉ is a side elevation of one form of operating handle which may be used with the key illustrated in Figs. 6ª, 6ᵇ, 6ᶜ and 6ᵈ of the drawing; and Fig. 6ᶠ is a front elevation of the operating handle shown in Fig. 6ᵉ of the drawing and further illustrated in assembled form in Fig. 6ᶜ of the drawing;

Fig. 7ª is a plan view of a blank for still another illustrative embodiment of the present invention;

Fig. 7ᵇ is a plan view of the blank of Fig. 7ª of the drawing folded so as to provide a substantially continuous trough defined by connected trough members;

Fig. 7ᶜ is a front elevation of the key member of Figs. 7ª and 7ᵇ of the drawing in fully assembled form;

Fig. 7ᵈ is a side elevation of the key shown in Fig. 7ᶜ of the drawing;

Fig. 7ᵉ is a fragmentary front elevation, partly in section and partly broken away, showing certain details of construction of the key illustrated in Figs. 7ª, 7ᵇ, 7ᶜ, and 7ᵈ of the drawing; and Fig. 7ᶠ is a cross sectional view of the same taken along line 7ᶠ—7ᶠ of Fig. 7ᵉ of the drawing;

Fig. 8ª is a plan view of a blank of still another illustrative embodiment of the present invention;

Fig. 8ᵇ is a plan view of the blank of Fig. 8ª of the drawing, partly broken away, showing such blank folded so as to provide a substantially continuous trough defined by connected trough members;

Fig. 8ᶜ is a front elevation of the member of Figs. 8ᵃ and 8ᵇ of the drawing in fully assembled form; and Fig. 8ᵈ is a side elevation of the key shown in Fig. 8ᶜ of the drawing;

Fig. 9ᵃ is a plan view of still another blank for forming the last remaining one of the aforesaid illustrative embodiments of the present invention;

Fig. 9ᵇ is a plan view of the blank of Fig. 9ᵃ of the drawing, partly broken away, showing such blank folded so as to provide a substantially continuous trough defined by connected trough members; and Fig. 9ᶜ is a side elevation of the key shown in Figs. 9ᵃ and 9ᵇ of the drawing showing such key in fully assembled form;

Fig. 10ᵃ is a plan view of a blank which constitutes still another illustrative embodiment of the present invention;

Fig. 10ᵇ is a plan view of such blank folded to provide a substantially continuous trough defined by connected trough members formed by the folding of the blank thus far;

Fig. 10ᶜ is a plan view of the fully formed key;

Fig. 10ᵈ is a side elevation of the fully formed key shown in Fig. 10ᶜ of the drawing;

Fig. 10ᵉ is a longitudinal section of the fully formed key taken along line 10ᵉ—10ᵉ of Fig. 10ᶜ of the drawing;

Fig. 10ᶠ is a transverse sectional view of the fully formed key shown in Fig. 10ᶜ of the drawing;

Fig. 10ᵍ is a side elevation of such key showing the manipulating handle attached thereto;

Fig. 10ʰ is a top plan view of the fully formed key shown in Fig. 10ᶜ of the drawing;

Fig. 10ⁱ is a sectional view of the fully formed key shown in Fig. 10ᶜ of the drawing taken along line 10ⁱ—10ⁱ of such figure of the drawing;

Fig. 10ʲ is a cross sectional view of the fully formed key of Fig. 10ᶜ of the drawing taken along line 10ʲ—10ʲ of such figure of the drawing; and Fig. 10ᵏ is a front elevation of the fully formed key showing the manipulating handle attached thereto.

Referring now to the aforesaid illustrative embodiments of the articles of the present invention, and more particularly to the drawings illustrating the same, and with special reference to the embodiment of the invention shown in Figs. 1ᵃ, 1ᵇ, 1ᶜ, 1ᵈ, 1ᵉ, 1ᶠ, 1ᵍ, 1ʰ, 1ⁱ, 1ʲ and 1ᵏ of the drawing, 10 indicates a blank which may be stamped of any suitable metal, such as steel, brass, German silver, or the like, and which preferably comprises a plurality of trough blank members 11 and 12 substantially continuous except that such trough blank portions 11 and 12 may be provided with a connection portion 13 of reduced width to enable such trough blank portions 11 and 12, after the troughs have been shaped therefrom, to be bent so as to be brought into converging or contacting relation, as will be described in detail later in this specification. By reason of the provision of the connection portion 13 of reduced width, there are provided in the blank 10 a plurality of slots or spaces 14, 15, and 16, 17, defining between them one or more, here shown as two, locking and reinforcing blank portions 18 and 19. The locking and reinforcing blank portions 18 and 19 are preferably provided with the respective slots 18' and 19' for a purpose to be described in considerable detail later in this specification.

Figure 1A:
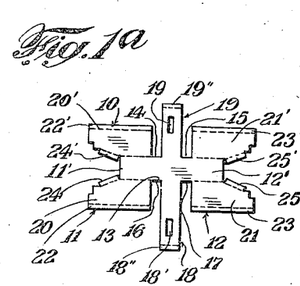
Figure 1B:
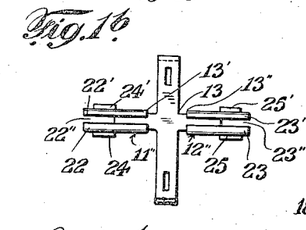

The trough blank portions 11 and 12 preferably consist of the bottom wall portions 11' and 12', and the side wall portions 20, 20', and 21, 21', respectively. There are also provided as a part of the side wall blank portions 20, 20', and 21, 21', the flange portions 22, 22', and 23, 23', for a purpose to be described in greater detail subsequently in this specification. Also forming a part of the lateral wall portions 20, 20', and 21, 21', are the key portions 24, 24', and 25, 25', for cooperation with the slots 18' and 19', respectively, formed in the locking and reinforcing members 18 and 19.

The blank 10 shown in Fig. 1ᵃ of the drawing is now shaped, as shown in Fig. 1ᵇ of the drawing, to provide a plurality of substantially continuous trough members formed from the trough blank portions 11 and 12 of the blank 10. For this purpose, the lateral wall portions 20, 20', and 21, 21', of the trough blank portions 11 and 12, respectively, are bent or folded upwardly or downwardly, as the case may be, thus providing the substantially continuous trough members 11" and 12" connected by the intermediate connecting blank portions 13. At the same time, or in another forming operation, the flange portions 22, 22', and 23, 23', are folded inwardly to define the respective passageways 22" and 23". Likewise, either simultaneously with, or in a forming operation separate from, either or both of the forming operations already referred to, the key portions 24, 24', and 25, 25', are folded outwardly into the positions shown in Fig. 1ᵇ of the drawing.

In the next operation, the trough members 11" and 12", defining the passageways 22" and 23", respectively, are bent adjacent the points 13' and 13", respectively, of the intermediate connecting portion 13 so as to be brought into the contacting or converging position more clearly shown in Figs. 1ᶜ and 1ᶠ of the drawing. After this operation has been completed, or simultaneously with such operation or with any one or more of the preceding operations, the locking and reinforcing members 18 and 19 are folded down over the converging trough members 11″ and 12″ so as to bring the perforations 18′ and 19′, respectively, of such locking and reinforcing members, over the adjacent pairs of key portions 24, 25, and 24′, 25′ as more clearly shown in Figs. 1ᶜ and 1ᵉ of the drawing.

Figures 1C, 1D:
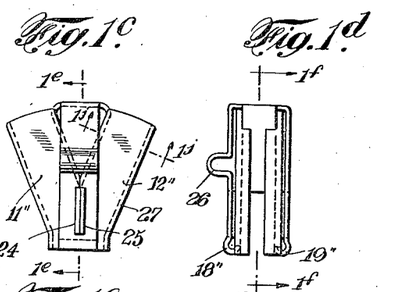
Figures 1E, 1F:
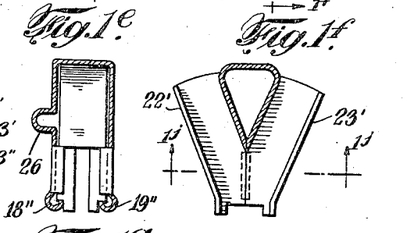
Figures 1G, 1I, 1J:
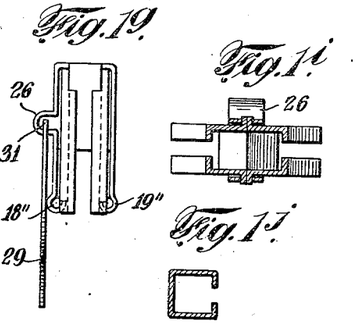
Figure 1H:
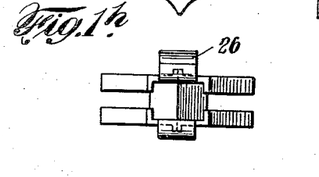
Figure 1K:
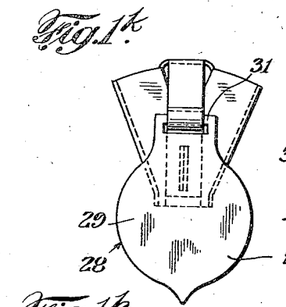

At the same time, or at any other portion of the forming operation, one of the locking and reinforcing members 18 and 19, such as the member 18, is provided with the integral looped portion 26 at an intermediate point of the locking or reinforcing member 18, and likewise at an intermediate point of the key as a whole, preferably above the center of such locking and reinforcing member and above the center of such key as a whole, for the purpose of providing a means of attachment to the key of a handle or other suitable manipulating member for the key. In completing the key member thus far described, the lower extremities of the locking and reinforcing members 18 and 19, here indicated by reference characters 18″ and 19″, may be inwardly turned, as more clearly shown in Figs. 1ᵈ, 1ᵉ and 1ᵍ of the drawing, to further reinforce the key which has been generally designated by reference character 27.

To complete the key, it is desirable to provide a handle or manipulating member, here generally designated by reference character 28, and preferably in the form of a flat tab comprising a main body portion 29 and the opposed ears or lug portions 30 and 31 which may be sprung or otherwise suitably inserted into the ends of the loop portion 26 with which the locking or reinforcing portion 18 is preferably provided.

This completes the description of the construction and mode of assembly of the first of the aforesaid illustrative embodiments of the present invention, as illustrated in Figs. 1ᵃ to 1ᵏ, inclusive, of the drawing. The manner of using the key made from the blank comprising the aforesaid illustrative embodiment of the present invention will be clear to those skilled in the art to which the present invention relates and need not be further described herein except to state that such key is threaded over the two cooperating flexible fastener-supporting elements carrying opposed cooperating pairs of fasteners of any suitable type, the key being adapted in one direction of its movement along the flexible fastening device with which it is intended to be used to lock cooperating pairs of fasteners and in the opposite direction of its movement along such flexible fastening device to open such cooperating pairs of fasteners.

The advantages of the foregoing illustrative embodiment of the present invention are numerous and of great practical importance. In the first place, by means of such a blank, the key, including the handle or manipulating member, may be very simply made, consisting of no more than two parts where a separate handle or manipulating member is employed. Indeed, where, as may often occur, the loop portion 26 may constitute sufficiently convenient means for operating the key along the flexible fastening device with which it is intended to be used, a separate handle or manipulating member may be omitted, so that the complete key, including the manipulating means for the same, consists of a single part.

Furthermore, the provision of the plurality of trough members, including bottom and side wall members and including also, preferably, though not necessarily, inwardly turned flange portions, which trough members define a plurality of independent but converging fastener-receiving channels, each fastener-receiving channel being separately and independently defined by its respective trough member, is a novel feature of great practical importance since it permits the omission of the usual rivets, spacing means, and means for preventing spreading hitherto employed in the art in the fabrication of keys or operating members for flexible fastening devices, in which structures cooperating channels are provided by a plurality of overlying wing members requiring the use of rivets, spacing means, and means for preventing the spreading of such wing members. By the avoidance of the use of wings, such rivets, spacing means and means for preventing spreading of the wings are entirely avoided.

The key made from the aforesaid illustrative embodiment of the present invention is further characterized by its strength, its little likelihood to get out of order and require repair, and the ease, convenience and accuracy with which it carries out the desired opening and closing operations when used with the flexible fastening devices with which it is intended to be employed. Other advantages and superiorities of such embodiment of the invention will readily occur to those skilled in the art to which the present invention relates.

It may here be stated that one of the principal advantages of the structures of the present invention, as exemplified, for instance, in the aforesaid illustrative embodiment of the same, is the ease with which any desired profile of the trough member to accommodate fasteners and fastening devices of different forms and configurations may be made. For example, while the trough members may be given the contour or profile illustrated in Fig. 1ʲ of the drawing, where such contour or profile is substantially square or rectangular, they may as readily be given the contour or profile shown in Fig. 2 of the drawing, where such contour or profile is substantially trapezoidal. In such form of the trough member, here designated by reference character 40, the bottom wall member has been designated by reference character 41, and the converging side wall members by reference characters 42 and 43, the inwardly directed flange portions 44 and 45 being preferably provided to define the fastener-receiving passageway 46.

Figures 2, 3, 4A, 4B, 4C, 4D, 5A, 5B, 5C, 6A, 6B, 6C, 6D, 6E, 6F:
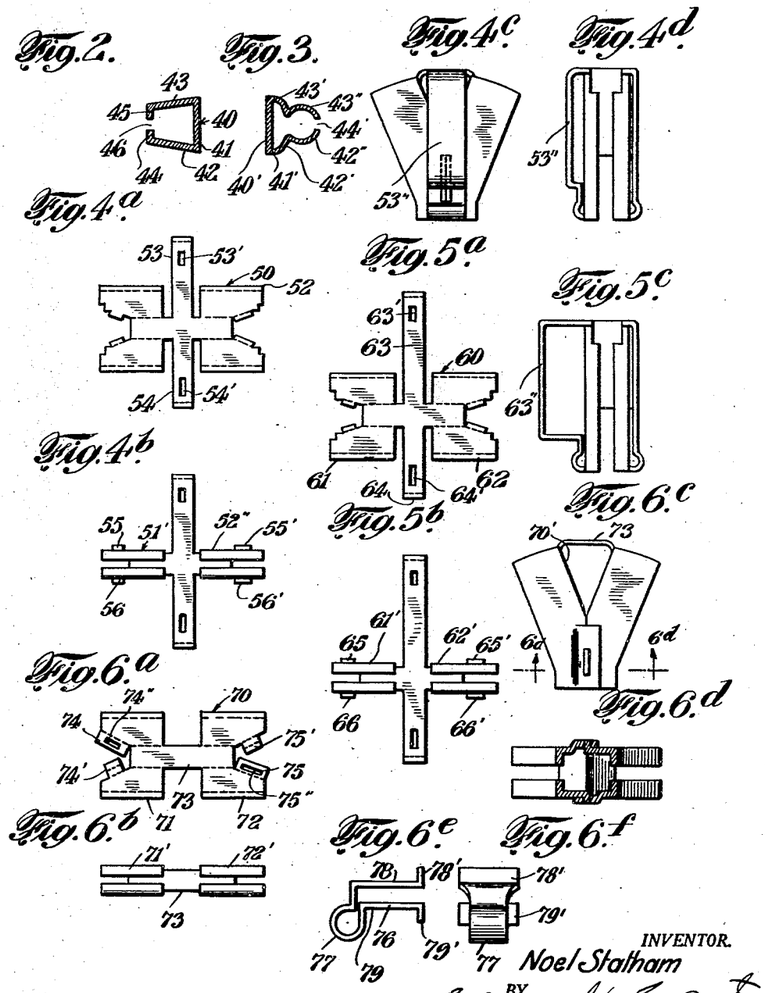

On the other hand, as shown in Fig. 3 of the drawing, more complicated forms or contours of the troughs may be just as readily made, as in the case of the simpler forms of the troughs illustrated in Figs. 1ʲ and 2 of the drawing. In the form illustrated in Fig. 3 of the drawing, the trough, there generally designated by reference character 40', may comprise the bottom wall portion 41' and the lateral walls 42' and 43', the latter comprising the arcuate portions 42'' and 43'', respectively, defining between them the fastener-receiving passageway 44'.

Turning now to the blank and key illustrated in Figs. 4ᵃ, 4ᵇ, 4ᶜ and 4ᵈ of the drawing, the type of key there illustrated lends itself for cooperation with a slidable handle or manipulating device. For this purpose, the blank 50 comprises the trough member blank portions 51 and 52, and the intervening locking or reinforcing member blank portions 53 and 54, respectively slotted at 53' and 54', as shown more clearly in Fig. 4ᵃ of the drawing. This blank is likewise shaped to provide a plurality of substantially continuous trough members designated by reference characters 51' and 52' in Fig. 4ᵇ of the drawing. At the same time there are provided the key portions 55, 55', and 56, 56', which in the fully formed condition of the key enter the respective slots 53' and 54', as more clearly shown in Figs. 4ᶜ and 4ᵈ of the drawing.

The finished key is illustrated in Figs. 4ᶜ and 4ᵈ of the drawing where 53' designates the formed reinforcing member blank portion 53 providing means of attachment for the handle or operating member or the key permitting slidable movement of such handle or operating member from one end to the other of the attaching means 53''. Otherwise the construction, arrangement of parts and modes of assembly, operation and use of this type of key or operating member are the same as for the key or operating member illustrated in Figs. 1ᵃ to 1ᵏ, inclusive, of the drawing, as described in detail above.

Referring now to Figs. 5ᵃ, 5ᵇ, and 5ᶜ of the drawing, wherein I have illustrated still another illustrative embodiment of the present invention, the key therein illustrated comprises a single unitary member made integrally in one piece and providing in one and the same integral member the trough members defining converging fastener-receiving passageways and the handle or manipulating member. For this purpose, I provide a blank here designated by reference character 60 and including the trough member blank portions 61 and 62 and the intervening locking and reinforcing member blank portions 63 and 64, respectively provided with the slots 63' and 64'. Here also the blank 60 is folded, as shown more clearly in Fig. 5ᵇ of the drawing, to provide a plurality of substantially aligned trough members 61' and 62' which may then be folded down into converging position in the arrangement more clearly shown in Fig. 5ᶜ of the drawing. At the same time there are formed on the trough member blank portions 61 and 62 the key portions 65, 65', and 66, 66', which enter the respective slots 63 and 64'.

In the fully formed position of the parts, as more clearly shown in Fig. 5ᶜ of the drawing, the reinforcing member blank portion 63 has been folded to provide the manipulating handle 63'' large enough and spaced far enough apart from the converging trough members to provide a sufficient grip for the fingers in the manipulation of the key or operating member along the flexible fastening device with which it is intended to be used. Otherwise the construction, arrangement of parts and modes of assembly, operation and use of the illustrative embodiment of the invention just described are the same as for the previous embodiments illustrated in the earlier figures of the drawing as described in detail in the foregoing portions of this specification.

Turning now to Figs. 6ᵃ, 6ᵇ, 6ᶜ, 6ᵉ and 6ᶠ of the drawing, I have there illustrated still another illustrative embodiment of the present invention in which the manipulating handle is preferably separately made and clamped in position between the converging trough members. For this purpose, I may employ a blank, such as that illustrated in Fig. 6ᵃ of the drawing, where such blank has been generally designated by reference character 70. The blank comprises the trough member blank portions 71 and 72 together with the connecting portion 73 and the locking or reinforcing portions 74, 74', and 75, 75', the portions 74 and 75 being slotted as indicated at 74'' and 75'', respectively, for the reception of the respective locking portions or ears 74' and 75'.

Here also the blank 70 is folded so as to provide the substantially aligned trough members 71 and 72, respectively, after which the trough members so formed are bent in to converging position, as shown more clearly in Fig. 6ᶜ of the drawing. In this position of the parts, the locking tongues or ears 74' and 75' are caused to enter the respective slots 74'' and 75'', as shown more clearly in Fig. 6ᵈ of the drawing, thus completing the main portion of the key or operating member.

The manipulating handle, here designated by reference character 76, is preferably made from a single blank so as to have the loop or manipulating portion 77 and the intermediate portions 78 and 79 provided with the transversely bent engaging portions 78' and 79′, respectively. The handle thus formed is inserted within the V-shaped space 70′ provided between the converging trough members 71′ and 72′ beneath the connection portion 73, as more clearly shown in Fig. 6ᶜ of the drawing. The engagement of the inner or bottom walls of the trough members 71′ and 72′ with the intermediate portions 78 and 79 and with the engaging portions 78′ and 79′ of the manipulating handle 76 locks such handle securely in place after the locking ears or lugs 74′ and 75′ have been caused to enter the respective slots 74″ and 75″ in the completion of the device. Otherwise, the construction, arrangement of parts and modes of assembly, operation and use of the illustrative embodiment of the devices of the present invention just described are the same as for the illustrative embodiments of the invention previously described in this specification.

Figures 7A, 7B, 7C, 7D, 7E, 7F, 8A, 8B, 8C, 8D, 9A, 9B, 9C:
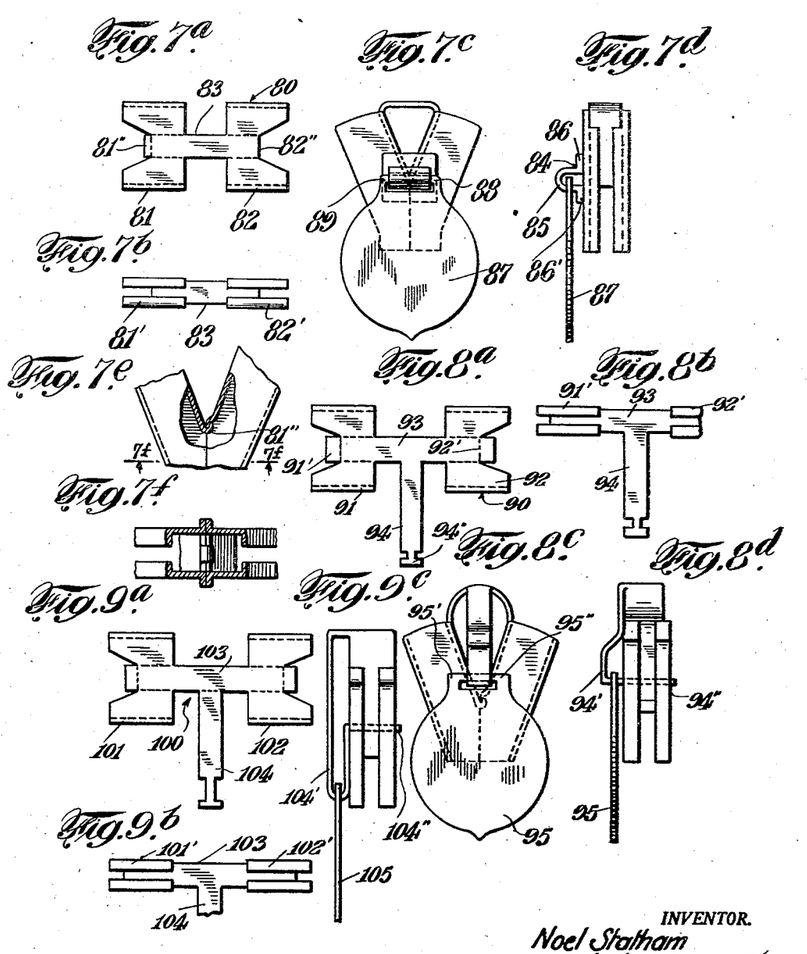

Turning now to Figs. 7ᵃ, 7ᵇ, 7ᶜ, 7ᵈ, 7ᵉ and 7ᶠ of the drawing, in which I have illustrated still another illustrative embodiment of the present invention, the device there illustrated is made up from a blank generally designated by reference character 80 and consisting of the trough member blank portions 81 and 82 and the connecting portion 83. Here also the trough member blank portions 81 and 82 are bent up, as shown more clearly in Fig. 7ᵇ of the drawing, to provide a plurality of substantially aligned troughs 81′ and 82′ which may thereafter be bent into converging position, as shown more clearly in Fig. 7ᶜ of the drawing. In order to lock and reinforce the converging trough members 81′ and 82′. I prefer to provide one of the trough member blank portions, such as the trough member blank portion 81, with the locking and reinforcing portion 81″ which may be bent or folded in under the edge portion 82″ of the remaining trough member blank portion 82 in the position more clearly shown in Fig. 7ᵉ of the drawing.

Here also I prefer that the handle or manipulating member for the key or operating member being described shall be made separately from and shall thereafter be applied to the key proper, as more clearly shown in Figs. 7ᶜ and 7ᵈ of the drawing. For this purpose I may use a strap of sheet metal providing a handle 84, such strap being bent so as to form the loop portion 85, for attachment of a handle thereto, and the connection portions 86 and 86′, which may be soldered or otherwise suitably attached to the converging trough members 81 and 82. 87 indicates the tab or manipulating portion of the handle shown as provided with a plurality of ears 88 and 89 which enter into the open ends of the loop portion 85 of the attaching means 84, as by being sprung into such open ends of the loop.

This completes the description of the construction and mode of assembly of the key or operating member shown in Figs. 7ᵃ, 7ᵇ, 7ᶜ, 7ᵈ, and 7ᵉ of the drawing. Otherwise the construction, arrangement of parts and modes of assembly, operation and use of this form of the device are substantially the same as for the forms of the device illustrated in the earlier figures of the drawing and described in the earlier portions of this specification.

Turning now to Figs. 8ᵃ, 8ᵇ, 8ᶜ, and 8ᵈ of the drawing, wherein I have illustrated still another of the aforesaid illustrative embodiments of the present invention, 90 indicates a blank including the trough member blank portions 91 and 92 and the intermediate connecting portion 93 provided with the intervening handle attaching portion 94. Here also the trough member blank portions 91 and 92 are folded so as to form the substantially aligned trough members 91′ and 92′, respectively. Thereafter, the troughs 91′ and 92′ so formed are folded into converging position, one of the trough member blank portions, such as the trough member blank portion 91, being preferably provided with the extension 91′ for coöperation with the edge portion 92′ of the remaining trough member blank portion 92 to provide locking and reinforcing means for the key, as shown more clearly in Fig. 8ᶜ of the drawing.

We provide means for attachment thereto in the finished position of the key or operating member of a handle designated by reference character 95. For this purpose the blank member 94 is folded over, preferably into the position shown in Figs. 8ᶜ and 8ᵈ of the drawing, in which position one portion 94′ of the blank member 94 is offset or looped so as to provide means of attachment thereto of the handle 95 by means of the ears or lugs 95′ and 95″ with which such handle is preferably provided. For this purpose such ears or lugs 95′ and 95″ are preferably sprung into the open ends of the loop portion 94′ of the blank portion 94.

The end portion 94″ of the blank portion 94 preferably passes through the substantially V-shaped opening between the converging trough members 91′ and 92′, in which position it is clamped between such converging trough members so as to provide a secure means of attachment to the key or operating member of the handle 95. It may here be stated that the outer end 94″ of the blank portion 94 is preferably slotted or otherwise formed so as to have locking engagement with the rear faces of the converging troughs 91′ and 92′, as shown more clearly in Fig. 8ᵈ of the drawing.

This completes the description of the construction, arrangement of parts and modes of assembly, operation and use of the aforesaid illustrative embodiment of the present invention, such modes of assembly, operation and use being substantially the same as for the forms of the invention illustrated in the earlier figures of the drawing and described in the earlier portions of this specification.

Turning now to the last remaining illustrative embodiment of the present invention, and referring more particularly to Figs. 9$^a$, 9$^b$ and 9$^c$ of the drawing illustrating the same, I have therein shown a blank 100 including the trough member blank portions 101 and 102 and the connecting portion 103 provided with the intervening handle attaching portion 104. Here also the trough member blank portions 101 and 102 are folded so as to provide substantially continuous or aligned troughs 101' and 102', respectively. The handle attaching portion 104 is preferably of such length and other dimensions as to provide means for attachment thereto of the handle or manipulating member so that the latter will have a slidable engagement along the key or operating member, as more clearly shown in Fig. 9$^c$ of the drawing. For this purpose, the handle attaching member 101 is bent down and then back so as to provide the elongated loop portion 104', the end portion 104'' preferably passing through the substantially V-shaped space defined between the converging trough 101' and 102', as in the case of the device illustrated in Figs. 8$^a$, 8$^b$, 8$^c$ and 8$^d$ of the drawing, which the device now being described most closely resembles of the various forms of the device hitherto described. Otherwise the construction, arrangement of parts and modes of assembly, operation and use of the device just described are the same as for the form of the device illustrated in Figs. 8$^a$, 8$^b$, 8$^c$, and 8$^d$ of the drawing, it being clear that the handle or operating device here designated by reference character 105 is slidably arranged for slidable manipulation from one end to the other of the key or operating member to which it is attached.

Figure 10:
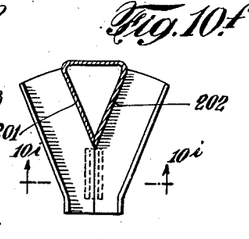

In the form of the device illustrated in Figs. 10$^a$ to 10$^k$ inclusive, which most closely resembles the key illustrated in Figs. 1$^a$ to 1$^k$, inclusive, of the drawing, and described in detail in the earlier portions of this specification. That is, there is provided a blank 200 having the trough member blank portions 201 and 202 and the intermediate locking and reinforcing members 203 and 204. The intermediate locking and reinforcing members 203 and 204 are provided with the slots 203' and 204', respectively, for receiving the key portions 205, 205', and 206, 206', respectively, in the formed position of the parts, as more clearly shown in Figs. 10$^h$ and 10$^i$ of the drawing.

In this case the lugs or locking portions 205, 205', and 206, 206', are wide enough to permit their being folded over through the slots 203' and 204', respectively, as more clearly shown in Figs. 10$^h$ and 10$^i$ of the drawing, thus avoiding the necessity of turning in the end portions 203'' and 204'' of the locking and reinforcing portions 203 and 204, respectively, as in the case of the key or operating member illustrated in Figs. 1$^a$ to 1$^k$ of the drawing. That is, the locking or reinforcing portions 203 and 204 may terminate adjacent the lower edges of the key or operating member formed of the blank 200, being preferably flush with the lower edges of the trough 201' and 202' illustrated in Figs. 10$^c$ of the drawing, or may even terminate slightly above the lower edges of the troughs.

In this form of the device, also the blank 200 preferably has the trough member blank portions 201 and 202 thereof folded so as to provide substantially continuous troughs 201' and 202', which are afterwards bent into converging relation with respect to each other, as shown more clearly in Fig. 10$^c$ of the drawing, after which the locking and reinforcing members 203 and 204 may be folded down over the converging troughs 201' and 202' so as to cause the locking lugs 205, 205', and 206, 206', to pass through the respective apertures 203' and 204', after which the blank portions comprising such locking lugs 205, 205', and 206, 206', may be folded down over the respective locking or reinforcing members 203 and 204 to thus complete the device, the width of the locking lugs 205, 205', and 206, 206', permitting this operation, as already described above.

As in the case of the key or operating member illustrated in Figs. 10$^a$ to 10$^k$, inclusive, of the drawing, there is provided in one of the locking or reinforcing members, as in the locking or reinforcing member 203, a handle-attaching loop portion 207 to which a manipulating handle or member 208 may be attached in the manner already described above. Otherwise, the construction, arrangement of parts and modes of assembly, operation and use of this last embodiment of the article of the present invention are substantially the same as for the illustrative embodiment illustrated in the earlier figures of this drawing, especially Figs. 1$^a$ to 1$^k$, inclusive, described in the earlier portions of this specification.

This completes the description of the aforesaid illustrative embodiments of the present invention. It is, however, to be clearly understood that the invention is not limited to the specific forms thereof illustrated in the drawing.

It will be seen that the keys of the present invention are simple in construction, easy to fabricate and assemble, consist of few parts, and are rugged and strong, thus being little liable to get out of order and require repair and being also adapted for accurate and convenient operation over long periods of time. It will be further noted that each of the devices illustrated in the drawing and described above makes use of a plurality of separate or independent trough members each individually defining a separate fastener-receiving passageway. Furthermore, the device does not make use of any rivets or any cooperating overlying wings defining by their cooperation a plurality of channels. The device, moreover, consists of very few parts, sometimes as few as two parts and in certain instances one part only. These are features of great practical and commercial importance which further emphasize the novelty of the keys or operating members of the present invention. Other advantages and superiorities of the articles of the present invention in construction, modes of assembly, operation and use will readily occur to those skilled in the art to which the present invention relates.

What I claim as my invention is:

1. The method of forming an operating member for flexible fastening devices and the like, which comprises providing a blank including a plurality of trough member blank portions, and thereafter forming said trough member blank portions into a plurality of trough members each defining its separate fastener-receiving passageway.

2. The method of forming an operating member for flexible fastening devices and the like, which comprises providing a blank including a plurality of trough member blank portions, and thereafter forming said trough member blank portions into a plurality of substantially aligned trough members each defining its separate fastener-receiving passageway.

3. The method of forming an operating member for flexible fastening devices and the like, which comprises providing a blank including a plurality of trough member blank portions, and thereafter forming said trough member blank portions into a plurality of trough members each defining its separate fastener-receiving passageway and each comprising a bottom wall member and associated side wall members.

4. The method of forming an operating member for flexible fastening devices and the like, which comprises providing a blank including a plurality of trough member blank portions, and thereafter forming said trough member blank portions into a plurality of substantially aligned trough members each defining its separate fastener-receiving passageway and each comprising a bottom wall member and associated side wall members.

5. The method of forming an operating member for flexible fastening devices and the like, which comprises providing a blank including a plurality of connected trough member blank portions, forming said connected trough member blank portions into a plurality of connected trough members each defining its separate fastener-receiving passageway and each comprising a bottom wall member and associated side wall members, and thereafter bringing the connected trough members so formed into converging relation with respect to each other.

6. The method of forming an operating member for flexible fastening devices and the like, which comprises providing a blank including a plurality of connected trough member blank portions, forming said connected trough member blank portions into a plurality of connected trough members each defining its separate fastener-receiving passageway, and thereafter bringing the connected trough members so formed into converging relation with respect to each other.

7. The method of forming an operating member for flexible fastening devices and the like, which comprises providing a blank including a plurality of connected trough member blank portions, forming said connected trough member blank portions into a plurality of substantially aligned connected trough members each defining its separate fastener-receiving passageway and each comprising a bottom wall member and associated side wall members, and thereafter bringing the connected trough members so formed into converging relation with respect to each other.

8. The method of forming an operating member for flexible fastening devices and the like, which comprises providing a blank including a plurality of connected trough member blank portions, forming said connected trough member blank portions into a plurality of substantially aligned connected trough members each defining its separate fastener-receiving passageway, and thereafter bringing the connected trough members so formed into converging relation with respect to each other.

9. The method of forming an operating member for flexible fastening devices and the like, which comprises providing a blank including a plurality of connected trough member blank portions and an intermediate reinforcing member blank portion, forming said connected trough member blank portions into a plurality of substantially aligned connected trough members each defining its separate fastener-receiving passageway and each comprising a bottom wall member and associated side wall members, bringing the connected trough members so formed into converging relation with respect to each other, and thereafter bringing said intermediate reinforcing member blank portion into position to reinforce the trough member so formed.

10. The method of forming an operating member for flexible fastening devices and the like, which comprises providing a blank including a plurality of connected trough member blank portions and an intermediate reinforcing member blank portion, forming said connected trough member blank portions into a plurality of connected trough members each defining its separate fastener-receiving passageway and each comprising a bottom wall member and associated side wall members, bringing the connected trough members so formed into converging relation with respect to each other, and thereafter bringing said intermediate reinforcing member blank portion into position to reinforce the trough member so formed.

11. The method of forming an operating member for flexible fastening devices and the like, which comprises providing a blank including a plurality of trough member blank portions and an intermediate reinforcing member blank portion, forming said trough member blank portions into a plurality of trough members each defining its separate fastener-receiving passageway and each comprising a bottom wall member and associated side wall members, and thereafter bringing said intermediate reinforcing member blank portion into position to reinforce the trough member so formed.

12. The method of forming an operating member for flexible fastening devices and the like, which comprises providing a blank including a plurality of trough member blank portions and an intermediate reinforcing member blank portion, forming said trough member blank portions into a plurality of trough members each defining its separate fastener-receiving passageway, and thereafter bringing said intermediate reinforcing member blank portion into position to reinforce the trough member so formed.

13. The method of forming an operating member for flexible fastening devices and the like, which comprises providing a blank including a plurality of connected trough member blank portions and an intermediate reinforcing member blank portion, forming said connected trough member blank portions into a plurality of substantially aligned connected trough members each defining its separate fastener-receiving passageway, bringing the connected trough members so formed into converging relation with respect to each other, and thereafter bringing said intermediate reinforcing member blank portion into position to reinforce the trough member so formed.

14. The method of forming an operating member for flexible fastening devices and the like, which comprises providing a blank including a plurality of connected trough member blank portions and an intermediate reinforcing member blank portion, forming said connected trough member blank portions into a plurality of connected trough members each defining its separate fastener-receiving passageway, bringing the connected trough members so formed into converging relation with respect to each other, and thereafter bringing said intermediate reinforcing member blank portion into position to reinforce the trough member so formed.

15. The method of forming an operating member for flexible fastening devices and the like, which comprises providing a blank including a plurality of trough member blank portions and an intermediate reinforcing member blank portion, forming said trough member blank portions into a plurality of substantially aligned trough members each defining its separate fastener-receiving passageway and each comprising a bottom wall member and associated side wall members, and thereafter bringing said intermediate reinforcing member blank portion into position to reinforce the trough member so formed.

16. The method of forming an operating member for flexible fastening devices and the like, which comprises providing a blank including a plurality of trough member blank portions and an intermediate reinforcing member blank portion, forming said trough member blank portions into a plurality of substantially aligned trough members each defining its separate fastener-receiving passageway, and thereafter bringing said intermediate reinforcing member blank portion into position to reinforce the trough member so formed.

17. A blank for an operating member for flexible fastening devices and the like, comprising a plurality of connected trough member blank portions each adapted to define an independent and separate passageway and an intermediate blank portion providing reinforcing means.

18. A blank for an operating member for flexible fastening devices and the like, comprising a plurality of connected trough member blank portions each adapted to define an independent and separate passageway and an intermediate blank portion providing reinforcing means and providing also means for attachment thereto of a manipulating member.

19. A blank for an operating member for flexible fastening devices and the like, comprising a plurality of connected trough member blank portions each providing a bottom wall blank portion and associated side wall blank portions, and an intermediate blank portion providing reinforcing means.

20. A blank for an operating member for flexible fastening devices and the like, comprising a plurality of connected trough member blank portions each providing a bottom wall blank portion and associated side wall blank portions, and an intermediate blank portion providing reinforcing means and providing also means for attachment thereto of a manipulating member.

21. A blank for an operating member for flexible fastening devices and the like, comprising a plurality of connected trough member blank portions each providing a bottom wall blank portion and associated side wall blank portions together with one or more locking portions, and an intermediate blank portion providing reinforcing means.

22. A blank for an operating member for flexible fastening devices and the like, comprising a plurality of connected trough member blank portions each providing a bottom wall blank portion and associated side wall blank portions together with one or more locking portions, and an intermediate blank portion providing reinforcing means and providing also means for attachment thereto of a manipulating member.

23. A blank for an operating member for flexible fastening devices and the like, comprising a plurality of connected trough member blank portions each providing a bottom wall blank portion and associated side wall blank portions together with one or more locking portions, and an intermediate blank portion providing reinforcing means, said intermediate blank portion being perforated for cooperation with said locking portion or portions.

24. A blank for an operating member for flexible fastening devices and the like, comprising a plurality of connected trough member blank portions each providing a bottom wall blank portion and associated side wall blank portions together with one or more locking portions, and an intermediate blank portion providing reinforcing means and providing also means for attachment thereto of a manipulating member, said intermediate blank portion being perforated for cooperation with said locking portion or portions.

25. In a blank for an operating member for flexible fastening devices and the like, a plurality of connected trough member blank portions, each adapted to define an independent and separate passageway.

26. In a blank for an operating member for flexible fastening devices and the like, a plurality of connected trough member blank portions, each providing a bottom wall blank portion and associated side wall blank portions.

In testimony whereof, I have signed my name to this specification this 1st day of June, 1926.

NOEL STATHAM.